United States Patent Office 2,889,274
Patented June 2, 1959

2,889,274

CATALYTIC DESULPHURIZATION OF PETROLEUM HYDROCARBONS AND PRODUCTION OF HYDROGEN THEREFROM

John Arthur Edgar Moy and John Rowland, Sunbury-on-Thames, England, assignors to The British Petroleum Company Limited, London, England, a British joint-stock corporation No Drawing. Application March 21, 1956
Serial No. 572,784

Claims priority, application Great Britain March 22, 1955

5 Claims. (Cl. 208—212)

This invention relates to the catalytic desulphurization of petroleum hydrocarbons by means of the autofining process, the nature of which is fully described inter alia in United States Patents Nos. 2,573,726, 2,574,445–51 and 2,640,802. As set forth in these patents the autofining operation is carried out under a temperature selected between about 650°–800° F. and a pressure selected between 25–500 p.s.i. ga. with the temperature and pressure being correlated with respect to one another to insure a net production of hydrogen.

In order to achieve adequate desulphurization of the higher boiling petroleum distillates, such as gas oils, it is generally necessary to operate under the equilibrium pressure method described in United States Patent No. 2,648,623. The equilibrium pressure obtainable with any particular feedstock depends upon the particular catalyst employed, the temperature and the space velocity. For a given catalyst, temperature and space velocity, the equilibrium pressure gradually falls from the maximum obtainable with fresh catalyst to a lower value, with decrease in the catalyst activity. The catalyst normally employed in the operation of the autofining process is of the kind comprising the oxides of cobalt and molybdenum either as such or in combined form incorporated with a metal oxide support, usually alumina. As set forth in Patent No. 2,648,623 in equilibrium pressure autofining, the temperature is selected between 650°–800° F. and the pressure is permitted to rise above 100 p.s.i. ga. until the amount of hydrogen produced equals the amount of hydrogen consumed at which point the system is in pressure equilibrium.

It has now been found that even after a petroleum feedstock has been autofined under equilibrium pressure conditions it is possible to produce a further quantity of hydrogen from the feedstock by subjecting it to autofining conditions at a fixed pressure below its equilibrium pressure. Very little if any, further desulphurization may be effected, but the additional hydrogen produced can be used with advantage, for example, for other hydrofining operations in the refinery.

According to the present invention therefore, a petroleum distillate is subjected to autofining under equilibrium pressure conditions to effect desulphurization of the distillate, and is thereafter again subjected to autofining conditions at a pressure below its equilibrium pressure.

Either stage of the process according to the invention, particularly the second stage thereof, may advantageously be carried out over a catalyst of the kind referred to which has been activated by the incorporation therein of a small amount, preferably between 0.1% and 6.0% by weight, of fluorine, as described in United States application No. 311,429, filed September 25, 1952, now Patent No. 2,800,429, granted July 23, 1957.

The invention will now be described with reference to the following example:

*Example*

A Kuwait gas oil was autofined under equilibrium pressure conditions as follows:

Catalyst _____ Mixed oxides of cobalt and molybdenum on alumina activated with aluminium fluoride ($MoO_3$=17.9; $CoO$=3.1; $F$=3.25 g./100 g. stable at 1020° F.).
Temperature _____ 780° F.
Space velocity _____ 1 v./v./hr.
Recycle rate _____ 1000 s.c.f./b. (set at 100 p.s.i. ga. and varying with pressure).
Pressure _____ Equilibrium, starting at 100 p.s.i. ga.
Duration _____ 121 hours.

The feedstock had the following inspection data:

S.G. 60° F./60° F. _____ 0.8435.
I.B.P. (ASTM distillation) _____ 248° C.
F.B.P. (ASTM distillation) _____ 360° C.
Sulphur content _____ 1.26% wt.
Br. No. _____ 3.7.
Aromatics (ASTM D875) _____ 14% vol.

The product from this run after caustic soda and water washing had the following inspection data:

S.G. 60° F./60° F. _____ 0.8250.
I.B.P. (ASTM distillation) _____ 85° C.
F.B.P (ASTM distillation) _____ 339° C.
Sulphur content _____ 0.02% wt.
Bromine No. _____ 7.1.
Aromatics (ASTM D875), percent vol. ____ 20.

This product was then reprocessed under the following conditions:

Temperature _____ 780° F.
Space velocity _____ 2 v./v./hr.
Recycle rate _____ 2000 s.c.f./B.
Pressure _____ 100 p.s.i. ga.
Duration _____ 40 hours.

Both fluorine-promoted and unpromoted catalysts were used.

The results were as follows:

| Catalyst | Mixed oxides of Cobalt and Molybdenum on Alumina | Mixed oxides of Cobalt and Molybdenum on Alumina activated with aluminium fluoride |
|---|---|---|
| Chemical Analysis g./100 g. of material stable @ 1,920° F.: | | |
| $MoO_3$ | 15.75 | 14.4 |
| $CoO$ | 3.2 | 3.2 |
| F | 0 | 3.36 |
| Hydrogen make, s.c.f./b | 39 | 51 |
| Liquid Product inspection data: | | |
| S.G. 60° F./60° F | 0.827 | 0.828 |
| I.V.P. (ASTM), ° C | .69 | .72 |
| F.B.P. (ASTM), ° C | 347 | 343 |
| Bromine No | 9.0 | 9.1 |
| Aromatics (ASTM D875), percent vol | 20.5 | 20.5 |

We claim:

1. A process for the catalytic desulphurization under autofining conditions of a petroleum distillate and the production of hydrogen therefrom comprising contacting the distillate in a reaction zone with a dehydrogenation-hydrogenation catalyst and hydrogen derived solely from the distillate at a temperature between about 650°–800° F. and allowing the pressure in said zone to rise to an equilibrium pressure above 100 p.s.i. ga. at which the hydrogen evolved equals the hydrogen consumed, recovering a distillate of reduced sulphur content, passing the recovered distillate through a reaction zone as the sole feedstock therein and in contact with a dehydrogenation-hydrogenation catalyst at a temperature between about 650°–800° F. and at a pressure below the equilibrium autofining pressure obtainable under the selected operating conditions employed in the desulphurizing reaction, recovering hydrogen from the products of reaction, and recovering a distillate having a sulphur content substantially equal to the sulphur content present prior to the second reaction.

2. A process according to claim 1, wherein the catalyst employed in the desulphurizing first stage comprises the oxides of cobalt and molybdenum incorporated with a support consisting essentially of alumina, the catalyst containing between 0.1% and 6.0% wt. of fluorine.

3. A process according to claim 1, wherein the catalyst employed in the second stage comprises the oxides of cobalt and molybdenum incorporated with a support consisting essentially of alumina, the catalyst containing between 0.1% and 6.0% wt. of fluorine.

4. A process according to claim 1, wherein the catalyst in both reaction stages comprises the oxides of cobalt and molybdenum incorporated with a support consisting essentially of alumina, the catalyst containing between 0.1% and 6.0% wt. of fluorine.

5. A process according to claim 1, wherein the petroleum distillate is a gas oil.

References Cited in the file of this patent
UNITED STATES PATENTS

| | | |
|---|---|---|
| 2,606,141 | Meyer | Aug. 5, 1952 |
| 2,648,623 | Porter et al. | Aug. 11, 1953 |
| 2,719,108 | Porter | Sept. 27, 1955 |
| 2,760,907 | Attane et al. | Aug. 28, 1956 |
| 2,800,429 | Porter et al. | July 23, 1957 |